Nov. 7, 1939.  A. R. THOMPSON  2,178,884
FILLING MACHINE
Filed June 10, 1936    5 Sheets-Sheet 1
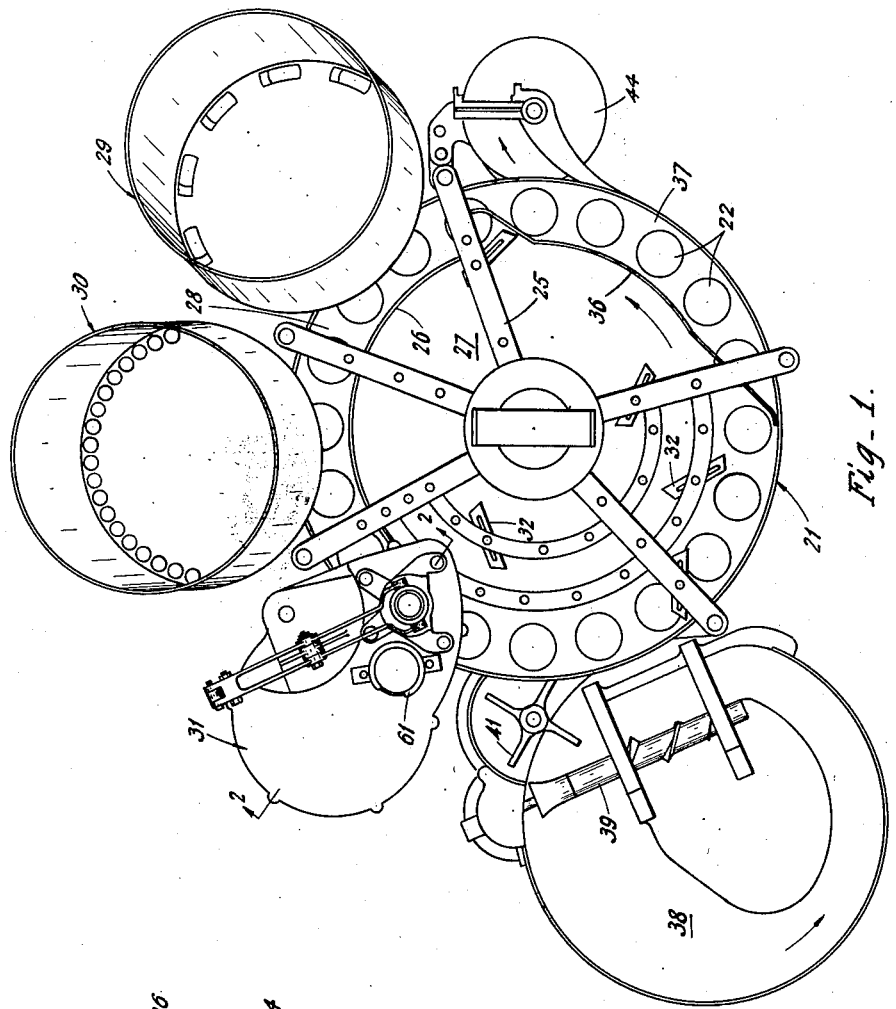
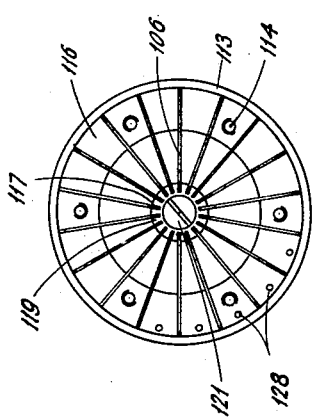
INVENTOR.
Albert R. Thompson.
BY Philip A. Minnis.
ATTORNEY.

Nov. 7, 1939.   A. R. THOMPSON   2,178,884
FILLING MACHINE
Filed June 10, 1936   5 Sheets-Sheet 2

INVENTOR.
Albert R. Thompson.
BY Philip A. Minnis
ATTORNEY.

INVENTOR.
Albert R. Thompson.
BY Philip A. Minms
ATTORNEY.

Nov. 7, 1939.　　　A. R. THOMPSON　　　2,178,884
FILLING MACHINE
Filed June 10, 1936　　　5 Sheets-Sheet 4

INVENTOR.
Albert R. Thompson.
BY Philip A. Minnis
ATTORNEY.

Nov. 7, 1939.   A. R. THOMPSON   2,178,884
FILLING MACHINE
Filed June 10, 1936   5 Sheets-Sheet 5

INVENTOR.
Albert. R. Thompson.
BY Philip A. Minnis
ATTORNEY.

Patented Nov. 7, 1939

2,178,884

UNITED STATES PATENT OFFICE 2,178,884

FILLING MACHINE

Albert R. Thompson, Los Gatos, Calif., assignor to Food Machinery Corporation, San Jose, Calif., a corporation of Delaware Application June 10, 1936, Serial No. 84,416

29 Claims. (Cl. 226—69)

This invention relates to machines for and a method of filling containers with a mixed charge of fruits, vegetables, or the like, in which a plurality of stocks are fed into the machine which deposits each different stock in the desired proportion in the containers therefor. More particularly, the invention is concerned with a filling machine of the character referred to having a stock feeder for cutting and feeding a selected amount of stock which is delivered to the feeder in sliced condition as, for example, sliced pineapple.

The invention is especially useful in preparing fruit cocktails and the like which are made up of individual stock such as sliced pineapple, cherries, grapes and the like, and bulk stock such as peaches and pears.

It is an object of the invention to provide a machine of the character referred to for automatically preparing and feeding a selected quantity of an individual stock.

Another object of the invention is to provide a machine of the character referred to, in which the amount of an individual stock can be varied in accordance with the desired charge for a container.

Another object of the invention is to provide a machine of the character referred to, in which an individual unit of stock can be cut into segments and placed in a plurality of mixed charges of stock.

Another object of the invention is to provide a machine of the character referred to, which includes a discharge spout of special construction for facilitating handling of stocks which are sticky, such as pineapple and the like.

Another object of the invention is to provide a stock feeder for a machine of the character referred to, in which a unit of stock is sliced into a plurality of small segments for feeding to the mixed charge.

Another object of the invention is to provide a stock feeder for a machine of the character referred to, which can be adapted to prepare and feed stock to a plurality of separate charges of stock.

Another object of the invention is to provide a stock feeder for a machine of the character referred to, which automatically cuts a unit of stock into a desired number of segments and discharges such segments into the charge of stock.

Another object of the invention is to provide a stock feeder which attains the foregoing objects and which is constructed to enable ready assembly of the parts in accordance with the requirements of each user.

Other objects will appear as the description progresses with reference to the accompanying drawings where I have shown a preferred embodiment of the invention especially designed for preparing and feeding sliced pineapple for use in a fruit cocktail.

In the drawings:

Fig. 1 is a schematic plan view of a filling machine with which my invention can be employed.

Fig. 8 (shown on Sheet 1) is a bottom plan view of the knife assembly forming the cutter.

Figs. 13 and 14 are, respectively, a vertical section and a bottom view of the upper part of the adapter.

Figs. 15 and 16 are, respectively, an elevational view and a plan view of the lower part of the adapter.

Figs. 17 and 18 are, respectively, a vertical section and a bottom view of the upper part of the adapter.

Figs. 19 and 20 are, respectively, an elevational view and a plan view of the lower part of the adapter.

Figure 2:
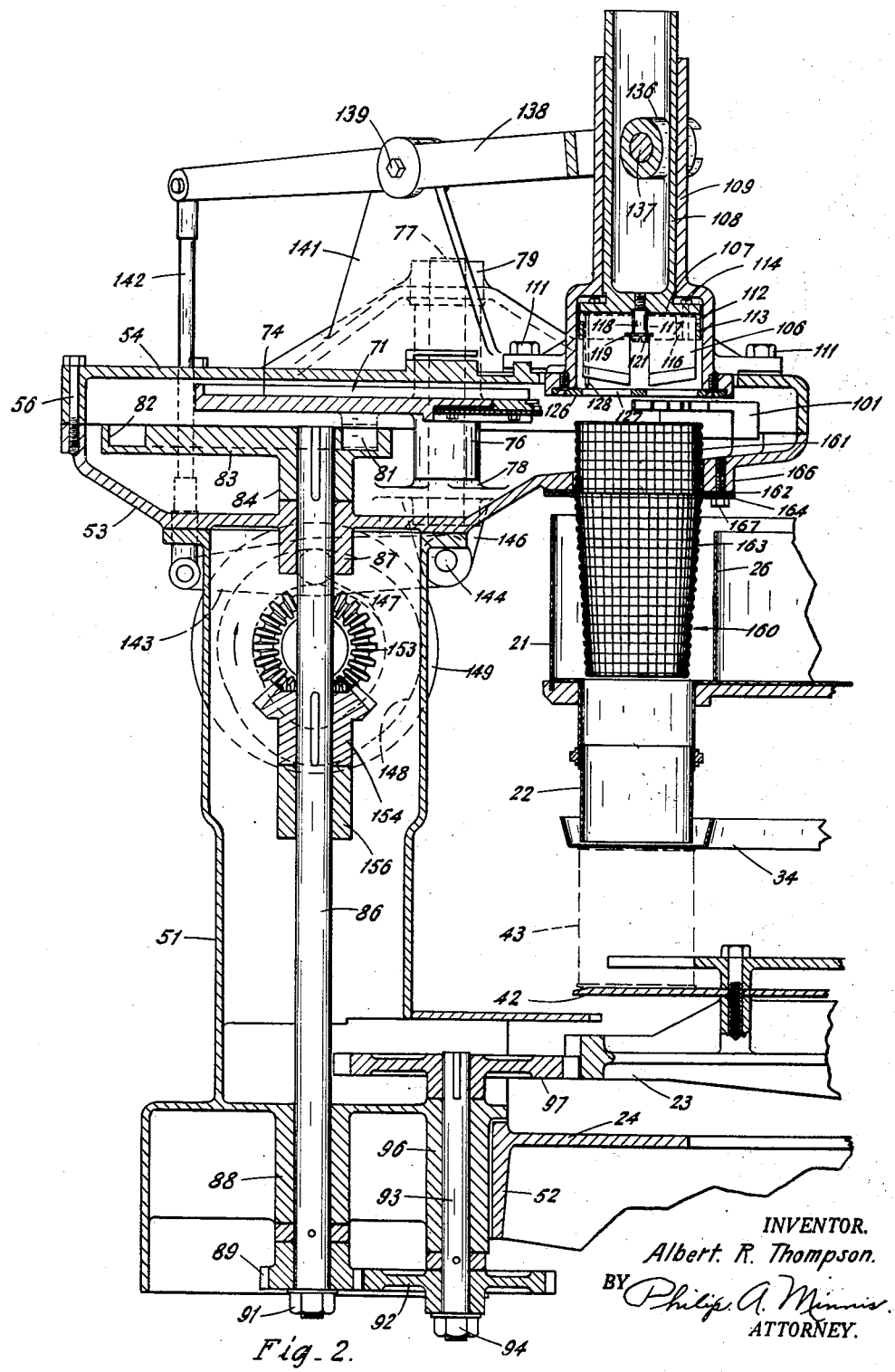
Fig. 2 is a vertical section through a stock cutter and feeder embodying my invention as employed in a filling machine of the type illustrated in Fig. 1. The view is taken in a plane indicated by the line 2—2 in Figs. 1 and 4.

As stated above, the stock cutter and feeder is especially adapted for use in a machine for preparing and placing in a container, a mixed charge in measured amounts of a plurality of stocks, some of which, because of their expensive nature or the character of the ingredient, are selected to form a small part of the contents of the containers, and others of which are selected to form the bulk of the contents of the containers. The invention will be described as embodied in a form adapted for use with the above described type of machine and more particularly as adapted for use in cutting and feeding sliced pineapple as one of the individual stocks of which a selected amount is desired as a part of the charge for each container.

Generally, in the filling machine includes a filling unit having an endless series of receptacles, preferably in the form of open ended pockets, with which are associated a plurality of individual stock feeders for dispensing measured amounts of the stocks contained therein into each receptacle, together with a bulk stock mixer and feeder for completing the charges of the receptacles.

All of the stock feeders are driven in synchronism with the series of receptacles, which also has synchronously related therewith, during one part of its travel, an endless chain of containers, such as cans or the like, into which the receptacles are emptied during their travel and thereby made ready for subsequent refilling. All of the parts of the machine may be adjustable to accommodate various sized containers, as well as to vary the proportion of any stock in the charge for a container.

A machine of the above character is disclosed in my co-pending application, Serial No. 75,661, filed April 22, 1936, and illustrates the type of machine with which the instant invention is preferably employed. Only the parts of the machine which form a part of this invention or which are necessary or desirable to an understanding thereof are disclosed herein.

The machine includes a bulk stock mixer and feeder including hopper 21 (Figs. 1 and 2) having an endless series of adjustable open ended receptacles or measuring pockets 22 mounted in the bottom thereof. Hopper 21 (Fig. 2) is mounted for rotation with drive gear 23 which may be journalled on frame 24 and driven from a suitable source of power. Hopper 21 (Fig. 1) has associated therewith an arcuate fence 26 mounted on stationary frame spider 25 to separate bulk stock containing area 27 from annular area 28 through which receptacles 22 pass for cooperation with individual stock feeders 29, 30 and 31. The individual stock feeders discharge a measured amount of the respective stocks, such as grapes, cherries and pineapple, into each receptacle as the receptacles become operatively associated therewith.

After receptacles 22 have moved past the individual stock feeders, they enter the outer portion of bulk stock containing area 27 and have bulk stock fed thereto by stationary mixing and spreading blades 32 depending from frame spider 25 in operative relation with respect to hopper 21. During the above described travel of the receptacles, they are maintained closed at the bottom by annular channel shaped closure element 34 (Fig. 2). As receptacles 22 leave bulk stock area 27, any excess stock is removed in passing under leveling fence 36 (Fig. 1) depending from spider 25. In annular filling area 37 between fence 36 and the outer wall of hopper 21, closure element 34 is cut away to place measuring pockets 22 in operative relation with the series of cans or containers which are synchronously related therewith. The empty containers are placed on feed disk 38 (Fig. 1) and fed by timing screw 39 and star wheel 41 onto container feed element 42 (Fig. 2) mounted on drive gear 23. A container 43 is shown in dotted lines on element 42 in Fig. 2. After discharge of the contents of the receptacles or measuring pockets 22 into the containers, such filled containers are guided by suitable guide elements onto discharge disc 44 (Fig. 1) from which they are removed by any suitable means.

With the above general description of the type of machine with which my instant invention is especially useful, I will now refer to the construction and operation of individual stock feeder 31 and the means associated therewith which form the subject matter of this application.

The illustrated embodiment of the stock feeder of the instant invention is constructed for use with stock which has been cut into slices of substantially uniform thickness and diameter, such as sliced pineapple for example. The stock feeder includes feeding means which operates to feed the stock one slice at a time to a cutter in the form of a knife assembly, which operates in timed relation to the operation of the feeding means to cut each slice of stock into a plurality of segments of uniform size. Thereafter the segments of each slice of stock may be discharged through a delivery spout to a pocket of the filling machine which is moving past the delivery spout. The feeder is adjustable to operate with slices of varying diameter, so that the amount to be delivered to a measuring pocket can be controlled by selecting the diameter of stock which is to be handled by the feeder. In addition, adapter means are provided to divide the number of segments cut into equal parts which are delivered separately and simultaneously to a plurality of the measuring pockets. In this manner, the stock can be cut and the segments can be counted into each charge in the correct proportion of the particular stock to the total mixed charge of the receptacle. It is to be understood that the feeding and cutting means of the stock feeder are operated synchronously with the movement of the receptacles, so that the proper amount of stock is delivered to each receptacle at the proper time. In this connection, it may be stated that although the feeder is illustrated in connection with a filling machine, with which it is preferably used, the feeder can also be used apart from such machine and various combinations of the parts of the feeder can be utilized in other machines, as well as with the one shown.

The feeder includes bracket 51 (Fig. 2) which may be bolted or otherwise secured to pad 52 of frame 24, and provides a support for the various parts of the stock feeder, as well as housing the drive means therefor. Secured to the top of bracket 51 is housing 53, having cover 54 secured thereon by studs 56. Housing 53 and cover 54 therefore serve to house and support the feeding, cutting, and discharge means of the feeder.

Figures 3, 6:
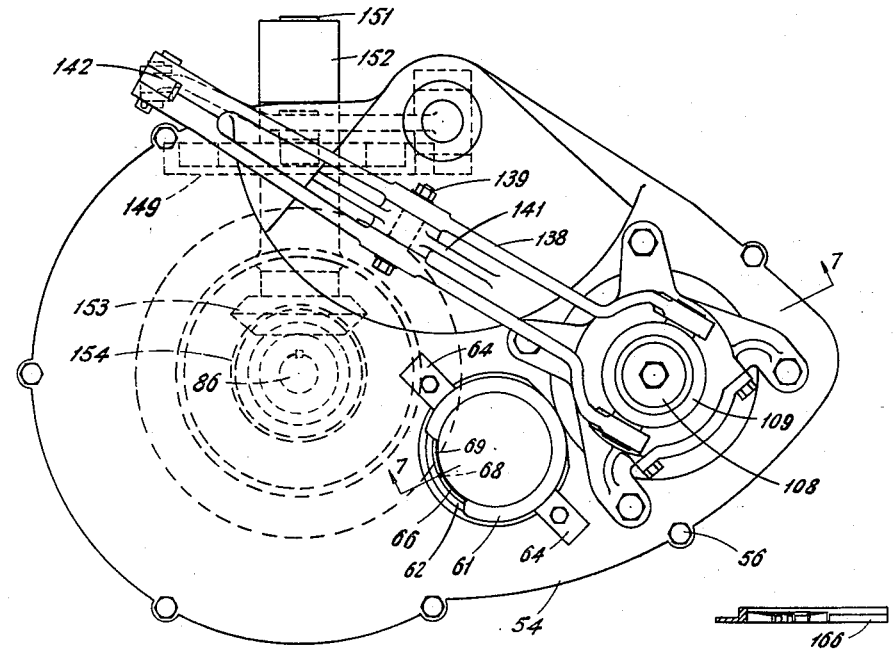
Fig. 3 is a plan view of the stock cutter and feeder.
Fig. 6 is a detailed section of the adapter shown in Fig. 5, and is taken in a plane indicated by the line 6—6 in Fig. 5.
Figure 7:
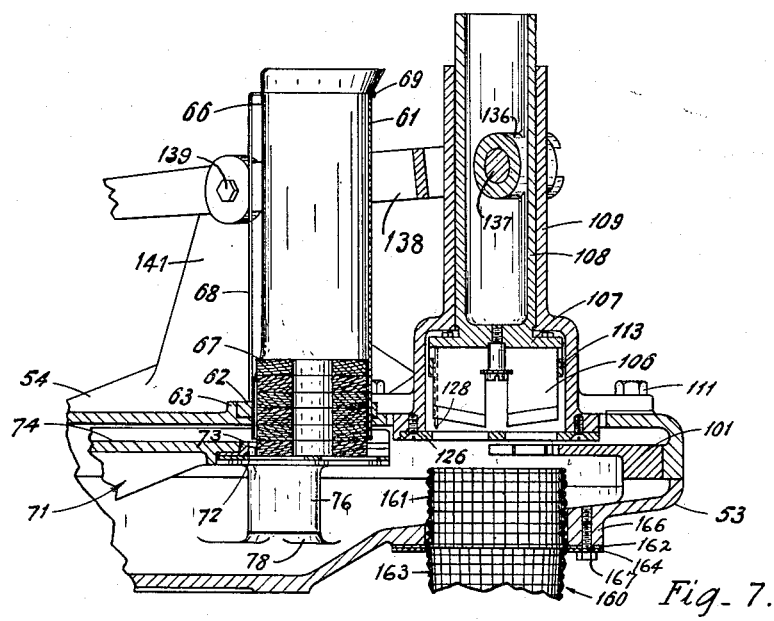
Fig. 7 is a fragmentary vertical section through the stock cutter and feeder and is taken in a plane indicated by the line 7—7 in Fig. 3.

The feeding means includes a holder for receiving a stack of sliced stock and an intermittently operated slice feeder and holder which repeatedly removes one slice of stock from the bottom of the stack and presents such slice to the cutting means while holding the slice in proper position for the cutting operation. The holder for the stack of sliced stock comprises cylindrical casing 61 (Figs. 3 and 7), which is secured in base ring 62, removably seated in annular recess 63 in cover 54 and having projecting ears 64 for connection with cover 54, by suitable cap screws, or the like. As seen in Fig. 7, casing 61 is flared outwardly at the top to facilitate the positioning therein of a stack of sliced stock 67, and is cut away at one side at 66 to enable observation of the amount of stock in the casing. Vertical wire 68 is positioned centrally of opening 66 to keep slices 67 properly centered. At the bottom, wire 68 is secured to ring 62, and at the top to a suitable wire bracing ring 69 for casing 61. Casing 61 extends through cover 54 and has its lower end positioned closely adjacent the upper surface of feed table 71 (Figs. 4 and 7) on which slices 67 are supported.

Figures 4, 5:
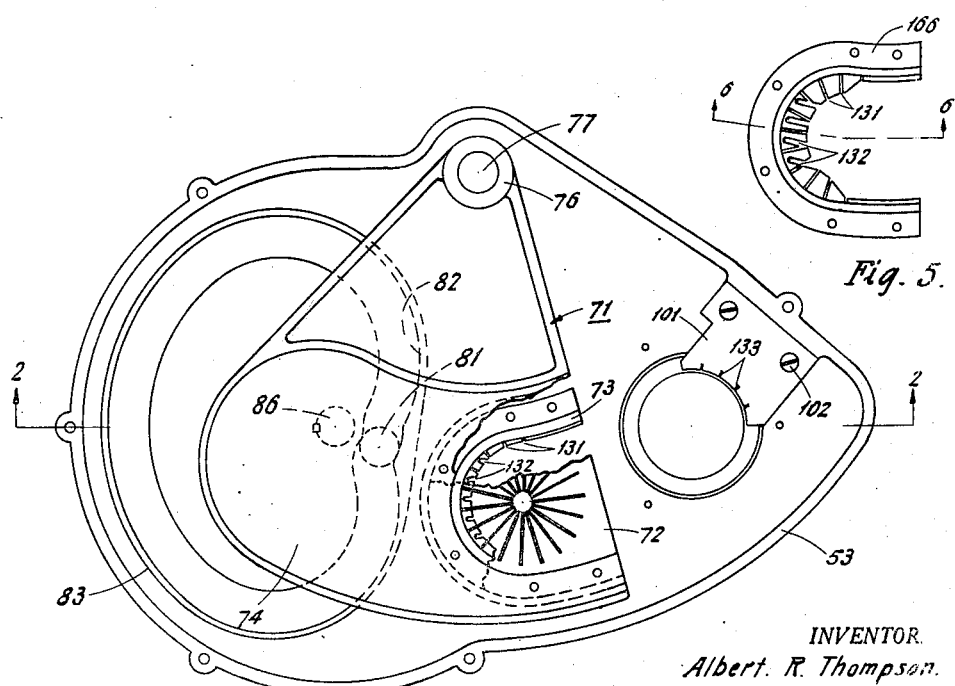
Fig. 4 is a plan view of the stock cutter and feeder with the cover and the elements mounted thereon removed to illustrate the feeder for the slices of stock.
Fig. 5 is a detailed plan view of an adapter for the slice feeder.

Removable means are mounted on feed table 71 for supporting the slices of stock, and for maintaining the bottom slice in centered relation with respect to feed table 71. For this purpose, the feed table 71 (Figs. 4 and 7) is provided with a U-shaped recess at one side thereof to receive a U-shaped adapter 73 of L-shaped cross section, and a slice supporting plate 72, which are secured to the table by suitable cap screws to provide a slice feeding seat therein. As seen in Fig. 4, feed table 71 has U-shaped planar portion 74 extending to the left from plate 72 for substantially the width of the outer end of feed table 71 for supporting stock slices 67 when feed table 71 is moved as described later from the position shown in Fig. 7 to that shown in Fig. 9.

As stated above, feed table 71 is operated repeatedly to feed slices of stock to the cutting means, and for this purpose is mounted for reciprocatory movement under the control of cam means operable synchronously with the cutting means. As pointed out hereafter, the reciprocatory nature of the feeding movement is especially useful in handling sticky stock, such as pineapple. Feed table 71 has boss 76 (Figs. 2 and 4) which is pivoted about shaft 77, which is supported by boss 78 of housing 53 and boss 79 of cover 54. Thus, slice feed table 71 can move in a counterclockwise direction from the position shown in Fig. 4 about the axis of shaft 77 and means are provided for repeatedly effecting such movement and return of feed table 71 to the position shown. Feed table 71 (Figs. 2 and 4) carries roller 81, suitably journalled thereon and engaging in cam groove 82 formed in the upper surface of cam plate 83, having hub 84 keyed on drive shaft 86 and resting on boss 87 of housing 53. Shaft 86 is journalled in boss 87 adjacent its upper end and adjacent its lower end in boss 88 of bracket 51. At its lower end shaft 86 carries a spur gear 89 removably secured thereon by nut 91 below a suitable spacer pinned on shaft 86. Gear 89 meshes with spur gear 92 secured on the lower end of shaft 93 by nut 94 below a suitable spacer pinned on shaft 93. Shaft 93 is journalled in boss 96 of bracket 51 and carries spur gear 97 keyed on its upper end, and meshing with drive gear 23 of the filling machine.

From the above described drive connection, it will be seen that shaft 86 and cam plate 83 are driven from drive gear 23 to reciprocate feed table 71 in timed relation to the operation of the filling machine.

At each reciprocation of feed table 71, a slice of stock is removed from casing 61, such removal being effected advantageously in spite of the sticky character of the stock by the reciprocation of feed table 71. As table 71 moves to the left from the position shown in Figs. 9 and 10 and planar portion 74 moves out from under casing 61, the right edge of bottom slice 67 drops down on plate 72 while the left edge which is pressed against casing 61 by the frictional drag of the slice on surface 74 sticks to casing 61 and remains up. Subsequently, when table 71 starts to the right from the position shown in Fig. 7, bottom slice 67 is carried with plate 72, and the left edge is broken away from casing 61 and drops on plate 72, so that the bottom slice 67 is then in the position shown in Fig. 7. Thus, the effective feeding of sticky stock, such as pineapple, is enabled by the reciprocatory movement of the feeder with respect to the stack of stock.

Figure 9:
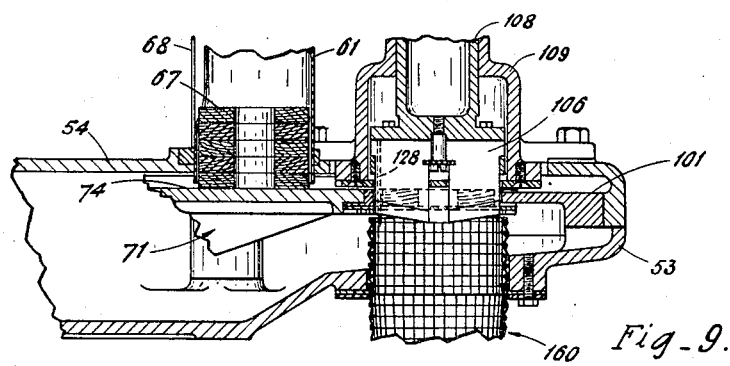
Figs. 9 and 10 are sections similar to Fig. 7 showing the position of parts at different stages in the operation of the machine.

As stated above, movement of feed table 71 from the position shown in Figs. 4 and 7 serves to remove one slice 67 from the lower end of the stack and carry it to the cutting station into operative relation with the cutting means and above a discharge opening. This condition of the parts is illustrated in Fig. 9, where it will be noted that a slice 67 has been severed by the cutting means about to be described, while planar portion 74 of feed table 71 is supporting the slices 67 remaining in casing 61. At the cutting station, the slice 67 to be cut is held on plate 72 between adapter 73 and an arcuate face of positioning bracket 101 (Figs. 4 and 9) which is removably secured as by screws 102 on housing 53. Thus the slice of stock to be cut into segments is centered with respect to the cutting means.

The cutting means comprises a plurality of knives which are positioned radially with respect to a common center, and which are reciprocated in timed relation to the operation of feed table 71. The cutter comprises knives 106 (Figs. 2, 7 and 8), which have their lower ends sharpened and slanting upwardly from the inner central edge. Knives 106 are detachably secured on a vertically reciprocating knife holder which includes head 107, and tubular extension 108, which is mounted for reciprocation in housing 109, secured on cover 54 by cap screws 111. At its outer edge, each knife 106 is provided with a shoulder 112 held between head 107 and retaining ring 113, secured to head 107 by cap screws 114 threaded in respective inner extensions 116 of ring 113 between which knives 106 are located. At their inner edges knives 106 have extensions 117 engaged with spacer 118, and held between head 107 and spider 119, by a cap screw 121 threaded in head 107.

Figure 11:
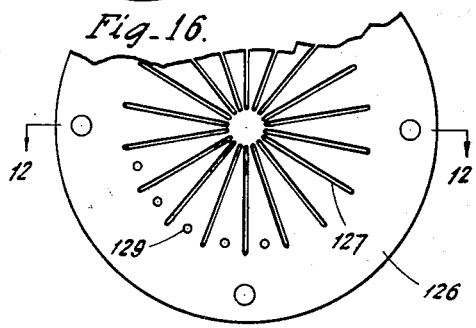
Figs. 11 and 12 are detailed views of the stripper plate associated with the cutter, Fig. 11 being a fragmentary plan view and Fig. 12 being a section taken in a plane indicated by the line 12—12 of Fig. 11.

Means are associated with the cutter to provide for stripping of cut segments from between the knives and to prevent removal of any cut segments by feed table 71. For this purpose, stripper plate 126 (Figs. 2 and 11), is secured by suitable cap screws to the lower face of housing 109, and has radial slots 127 aligned with knives 106. In addition, a plurality of pins 128 are mounted in ring 113 between certain of knives 106 in the line of movement of feeder table 71. Pins 128 are adjacent and extend below the outer ends of the associated knives 106, so that they will remain engaged with cut segments of stock after withdrawal of knives 106 and movement of feed table 71 to inoperative position. To accommodate pins 128, stripper plate 126 is provided with a plurality of apertures 129, through which pins 128 pass during the downward movement of the knife assembly. In addition, plate 72 (Fig. 4) and adapter 73, are provided with radially extending slots 131 and spaced notches 132 to accommodate knives 106 and pins 128, respectively. Positioning bracket 101 is also provided with radially extending slots 133 to receive knives 106.

Means are provided for reciprocating the knife assembly of the cutter in timed relation to the oscillation of feed table 71. For this purpose, extension 108 (Fig. 2) of the knife holder is provided with transverse boss 136 in which pin 137 is journalled. Pin 137 extends outwardly at both ends through suitable slots (not shown) in housing 109, and has its ends engaged by the opposite forks of bifurcated operating lever 138 (Figs. 2 and 3) which is pivoted at 139 in bracket portion 141 of cover 54. At its opposite end, lever 138 is pivotally connected to link 142 which is pivotally connected at its lower end to operating lever 143. Operating lever 143 is pivoted at 144 in ears 146 of housing 53 and intermediate its ends carries roller 147 which is engaged in cam groove 148 of cam plate 149. Cam plate 149 is mounted on transverse shaft 151 (Fig. 3) journalled in boss 152 of bracket 51. Within bracket 51, shaft 151 carries bevel gear 153 which meshes with bevel gear 154, keyed on operating shaft 86 above boss 156 of bracket 51.

Figure 10:
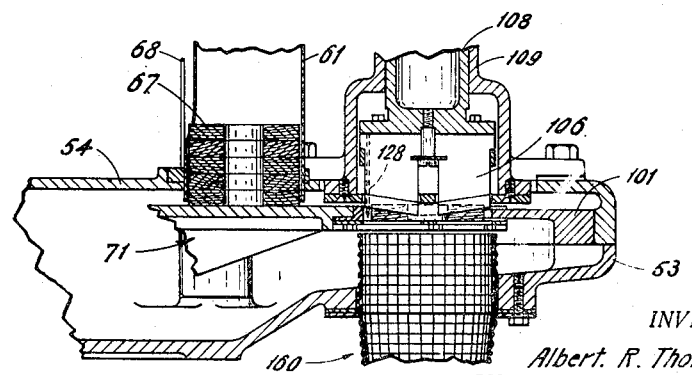
Figure 13:
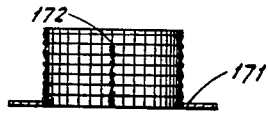
Figs. 13 to 16 illustrate a discharge spout adapter which enables separation of the segments of stock into two equal parts and simultaneous feeding thereof to two separate charges of stock.
Figure 17:
Figs. 17 through 20 illustrate an adapter for separating the cut segments of stock into three equal parts and simultaneously feeding such parts to three separate charges of stock.
Figure 14:
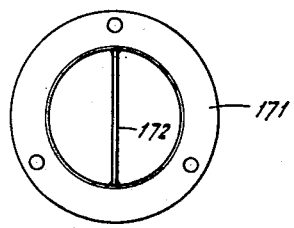
Figure 18:
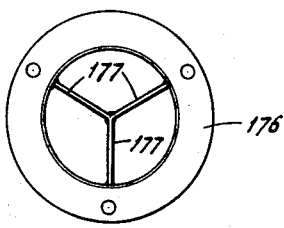
Figure 15:
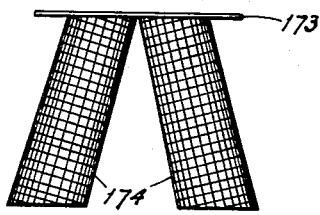
Figure 19:
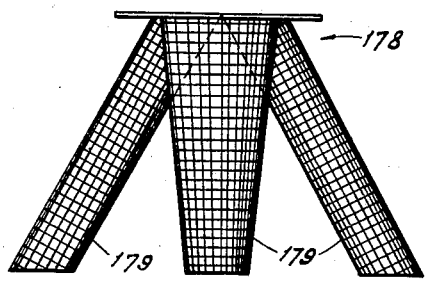
Figure 16:
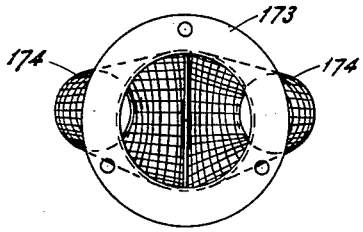
Figure 20:
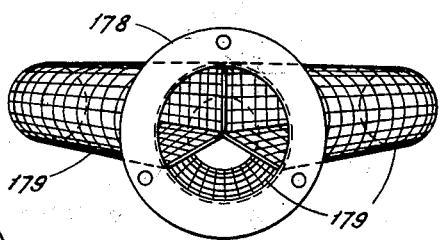
Figure 12:
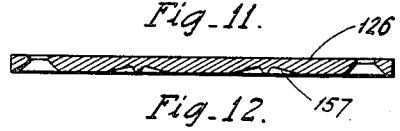

From the above description, it is seen that the knife assembly including knives 106 and pins 128, is reciprocated in a timed relation to the rotation of shaft 86 and consequently in a timed relation to the reciprocation of feed table 71. The parts are shown in Fig. 7 at the beginning of a feeding and cutting cycle, when feed table 71 has received a slice 67 of the stock supported on plate 72 and positioned by adapter 73, and when knives 106 are in raised inoperative position. Fig. 9 shows the relation of the parts at the end of the cutting stroke, when slice 67 held between adapter 73 and bracket 101 has been severed into a plurality of segments by knives 106, which have passed completely through supporting plate 72. During this portion of the cycle, roller 81 is engaged with a circular part of cam groove 82, so that feeder 71 remains in its fully reciprocated position throughout the cutting stroke of knives 106. Fig. 10 illustrates the condition of the parts after knives 106 have partially raised from the position shown in Fig. 9. It will be noted in Fig. 10 that feed table 71 remains in operative position while the knives 106 start their upward movement, and that pins 128 remain in operative relation with the segments of slice 67, which might otherwise be withdrawn with feed table 71. As knives 106 move upwardly, any segments which are retained between the knives, are removed therefrom by engagement with the bottom side of stripper plate 126, which as seen in Fig. 12 is provided with spaced recesses 157 forming a roughened surface to prevent sticking of segments thereto.

With knives 106 in the position shown in Fig. 10, withdrawal thereof is retarded to retain pins 128 in operative position while feed table 71 starts its withdrawal. Thus, any possibility of cut segments being carried back by table 71 is precluded.

After feed table 71 and knives 106 have com- fall into discharge means for delivery to the associated measuring pocket. As illustrated in Fig. 2, discharge means 160 comprises upper cylindrical section 161 of wire mesh, which is secured at its lower end to ring 162, and lower tapered section 163 of wire mesh secured at its upper end to ring 164. Rings 162 and 164 are secured to the lower surface of boss 166 of housing 53 by cap screws 167. The wire mesh construction of discharge spout 160, including sections 161 and 163, insures that no segments of cut stock will adhere thereto instead of falling into a measuring pocket 22, which registers therewith, at the proper time to receive the segments from the knives.

To adapt the stock cutter and feeder to slices of smaller diameter, as for example, sliced pineapple of No. 2 size, adapter 166 (Figs. 5 and 6), may be utilized in place of adapter 73 (Fig. 4) which is of a size to accommodate a No. 2½ pineapple slice. Also bracket 101 is replaced by a similar bracket to cooperate with a No. 2 size slice, and casing 61 is replaced by a similar casing of the proper size.

If desired, the segments cut by knives 106 can be discharged into a plurality of charges of stock, each of which receives an equal number of segments. For this purpose, the discharge means has its opening aligned with and below the cutting station, and the opening is divided into a plurality of segmental openings by walls which are in vertical alignment with certain of knives 106. Figs. 13 through 16 illustrate an adapter for use in place of discharge spout 160, which comprises upper section 171 similar to upper section 161, but having dividing strip 172 of wire mesh, extending across a diameter thereof. Lower section 173 of the adapter comprises a pair of discharge spouts 174 of wire mesh construction, terminating at their upper ends in semi-circular openings, corresponding to and aligned with the openings provided by dividing wall 172. In the machine, the adapter is assembled with spouts 174 in line with the direction of travel of receptacles 22 and spaced apart the proper distance to simultaneously deliver segments of stock to a pair of adjacent receptacles 22.

Figs. 17 through 20 illustrate an adapter for separating the segments cut from a slice into three equal parts and for simultaneously delivering such parts to successive receptacles 22. Upper adapter section 176 (Figs. 17 and 18), has the circular cross section thereof divided into three equal parts by wire mesh dividing walls 177, and lower adapter section 178 includes three discharge spouts 179 of wire mesh construction which terminate at their upper end in respective segmental openings corresponding to and aligned with the segmental openings defined by walls 177. In addition, spouts 179 have their lower ends positioned in the arcuate path of travel of receptacles 22, so that spouts 179 can be associated simultaneously with three adjacent receptacles 22.

It will be understood that in adapting the machine to split up the segments from one slice of stock into two or three parts, the gear ratio of the drive therefor will be correspondingly changed by removing gears 89 and 92 (Fig. 2) and replacing them with similar gears of appropriate pitch diameters so that the stock feeder will be driven at either one-half or one-third the speed determined by gears 89 and 92 when the single opening discharge spout shown in Fig. 2 is used.

While I have shown and described my invention in connection with a preferred embodiment thereof, it is to be understood that the invention is capable of variations and modification. Therefore, the scope of my invention is to be limited only by the scope of the claims appended hereto.

I claim:

1. In a machine for preparing sliced stock, such as sliced pineapple, a stock holder having an open bottom, a cutter adjacent said holder, a reciprocating feeder always underlying the stock in said holder for removing stock through said holder bottom and for bodily transferring such stock into operative relation with said cutter, and means for operating said feeder to provide a back and forth movement thereof during transfer of stock thereto to facilitate deposit of stock from said holder onto said feeder.

2. In a machine for preparing sliced stock such as sliced pineapple, means for holding a stack of sliced stock, means for cutting sliced stock into segments, reciprocatory feeding means for repeatedly removing slices of stock from said holding means and for presenting and supporting said slices of stock in operative relation with respect to said cutting means, and means for operating said feeding means and said cutting means synchronously, said operating means providing a back and forth movement of said feeding means during transfer of stock thereto from said stock holding means.

3. In a machine for preparing sliced stock such as sliced pineapple, means for holding a stack of sliced stock, means including a plurality of radially extending knives for cutting sliced stock into segments, feeding means for repeatedly removing slices of stock from said holding means and presenting said slices of stock to said cutting means, means for operating said feeding means and said cutting means synchronously, and a plurality of pins mounted between certain of said knives in the path of withdrawal of said feeding means to prevent withdrawal of cut stock therewith.

4. In a machine for preparing sliced stock such as sliced pineapple, means for holding a stack of sliced stock, vertically movable means for cutting sliced stock into segments, horizontally reciprocable feeding means for removing stock from said holding means and for presenting and supporting such stock in operative relation with respect to said cutting means, and means for operating said feeding and cutting means synchronously, said operating means providing a back and forth movement of said feeding means during transfer of stock thereto from said stock holding means.

5. In a machine for preparing sliced stock such as sliced pineapple, means for holding a stack of sliced stock, vertically movable means for cutting sliced stock into segments, horizontally movable feeding means for removing stock from said holding means and holding such stock in operative relation with respect to said cutting means, means for operating said feeding and cutting means synchronously, and means associated with said cutting means for preventing withdrawal of cut segments of stock with said feeding means.

6. In a machine for preparing sliced stock such as sliced pineapple, means for holding a stack of sliced stock, vertically movable means for cutting sliced stock into segments, horizontally reciprocable feeding means for removing stock from said holding means and for presenting and supporting such stock in operative relation with respect to said cutting means, and means for operating said feeding and cutting means synchronously including means for effecting a dwell in the operation of said feeding means during operation of said cutting means, and also including means providing a back and forth movement of said feeding means during transfer of stock thereto from said stock holding means.

7. In a stock preparation machine, a frame, a casing mounted in vertical position on said frame for holding a stack of stock, said casing having an open bottom, a horizontally disposed feed table mounted for reciprocation on said frame beneath said casing, said table having a seat for positioning below said casing to receive stock therefrom and having a portion adjacent said seat to close said casing bottom while said seat is out of alignment therewith, a cutter mounted on said frame for vertical movement, discharge means providing a discharge opening below said cutter, and means for operating said table to move said seat from alignment with said casing into alignment with said cutter above said discharge opening.

8. In a stock preparation machine, a frame, a casing mounted in vertical position on said frame for holding a stack of stock, said casing having an open bottom, a horizontally disposed feed table mounted for reciprocation on said frame beneath said casing, said table having a perforated seat for positioning below said casing to receive stock therefrom and having a portion adjacent said seat to close said casing bottom while said seat is out of alignment therewith, a cutter including a plurality of radially disposed knives mounted on said frame for vertical movement, discharge means providing a discharge opening below said cutter, and means for operating said table to move said seat from alignment with said casing into alignment with said cutter above said discharge opening, the perforations in said seat providing for penetration of said knives beyond the seat.

9. In a stock preparation machine, a frame, a casing mounted in vertical position on said frame for holding a stack of stock, said casing having an open bottom, a horizontally disposed feed table mounted for reciprocation on said frame beneath said casing, said table having a seat for positioning below said casing to receive stock therefrom and having a portion adjacent said seat to close said casing bottom while said seat is out of alignment therewith, a cutter mounted on said frame for vertical movement, discharge means providing a discharge opening below said cutter, means for operating said table to move said seat from alignment with said casing into alignment with said cutter and above said discharge opening, said operating means including means for effecting a dwell in the reciprocation of said table to maintain said table relatively stationary for a period with said seat aligned with said cutter, and means for operating said cutter during said dwell.

10. In a stock preparation machine, a frame, a casing mounted in vertical position on said frame for holding a stack of stock, said casing having an open bottom, a horizontally disposed feed table mounted for reciprocation on said frame beneath said casing, said table having a seat for positioning below said casing to receive stock therefrom and having a portion adjacent said seat to close said casing bottom while said seat is out of alignment therewith, a cutter mounted on said frame for vertical movement, discharge means providing a discharge opening below said cutter, means for operating said table to move said seat from alignment with said casing into alignment with said cutter and above said discharge opening, said operating means including means for effecting a dwell in the reciprocation of said table to maintain said table relatively stationary for a period with said seat aligned with said cutter, means for operating said cutter during said dwell, and means associated with said knife to prevent withdrawal of cut stock with said table.

11. In a machine for preparing sliced stock such as sliced pineapple, a stock holder having an open bottom, a cutter adjacent said holder, feeding means always underlying the stock in said holder for removing stock through said holder bottom and for bodily transferring such stock into operative relation with said cutter, and means for operating said feeding means to provide a back and forth movement thereof during transfer of stock thereto to facilitate deposit of stock from said holder onto said feeding means.

12. In a machine for preparing sliced stock such as sliced pineapple, a stock cutter, means for holding a stack of stock units, a reciprocatory feed table always underlying said stock and having a stock unit receiving seat for alignment with said stack holding means to receive stock therefrom and for subsequent alignment with said cutter to present the stock thereto, and means for operating said feed table including means for effecting a back and forth movement thereof during transfer of stock from said stack holding means to said seat.

13. In a machine for preparing sliced stock such as sliced pineapple, a stock cutter, means for holding a stack of stock units, stock feeding means always underlying said stock and having a stock unit receiving seat for alignment with said stack holding means to receive stock therefrom and for subsequent alignment with said cutter to present the stock thereto, and means for operating said feeding means including means for effecting a back and forth movement thereof during transfer of stock from said stack holding means to said seat.

14. In a machine for preparing sliced stock such as sliced pineapple, a stock cutter, a casing for holding a stock of stock units, said casing having an open bottom, a feed table always underlying said stock and having a stock unit receiving seat for alignment with said casing to receive stock therefrom and for subsequent alignment with said cutter to present the stock thereto, said table also having means for closing the bottom of said casing during presentation of stock to said cutter, and means for reciprocating said feed table between said cutter and said casing including means for effecting a back and forth movement of said feed table during transfer of stock thereto from said casing.

15. In a machine for preparing sliced stock such as sliced pineapple, a stock holder, a stock cutter, feeding means for removing stock from said holder and presenting such stock to said cutter, and stop means adjacent said cutter and cooperating with said feeding means to align stock with respect to said cutter by engagement with an edge of the stock.

16. In a machine for preparing sliced stock such as sliced pineapple, a stock holder, a stock cutter, feeding means including a stock receiving seat for removing stock from said holder and presenting such stock to said cutter, positioning means adjacent said cutter and cooperating with said seat to align stock with respect to said cutter, and means for adapting said seat and said positioning means for operating with stock of various sizes.

17. In a machine for preparing sliced stock such as sliced pineapple, a stock cutter comprising a plurality of knives, means for presenting stock to said knives, and a stripper plate positioned between said cutter and said stock presenting means, said plate being apertured to permit passage of said knives therethrough and having the stock engaging face thereof roughened to prevent sticking thereto of cut stock.

18. In a stock preparation machine, a stock cutter comprising a plurality of knives, means for presenting stock to said knives, stock holding means movable with said cutter to prevent withdrawal of stock with said presenting means, and a stripper plate positioned between said cutter and said stock presenting means, said plate being apertured to permit passage of said knives and said holding means therethrough.

19. In a stock preparation machine for cutting sliced stock into segments, a stock holder, a cutter, a feeder for transferring stock from said holder and supporting the stock in relation with respect to said cutter, and discharge means positioned below and in alignment with said cutter for receiving the segments of cut stock therefrom upon withdrawal of said feeder.

20. In a stock preparation machine, a stock holder, a cutter for separating stock into uniform segments, a feeder for transferring stock from said holder into operative relation with said cutter, and discharge means for receiving cut stock from said cutter, said discharge means including means for separating cut stock into a plurality of separate portions.

21. In a stock preparation machine for cutting sliced stock into segments, a vertically reciprocable cutter, discharge means positioned below and in vertical alignment with said cutter, and feeding means for positioning and supporting slices of stock in operative relation between and in vertical alignment with said cutter and said discharge means.

22. In a stock preparation machine for cutting sliced stock into segments, a stock holder, a cutter comprising a plurality of knives, a feeder for transferring slices of stock from said holder into operative relation with said cutter and having slots for alignment with said knives during the cutting operation, and discharge means for receiving cut stock from said cutter, said discharge means including partitions aligned with certain of said knives to provide separate discharge paths for different segments of stock.

23. In a stock preparation machine for cutting sliced stock into segments, a holder for a stack of sliced stock, a cutter, a feeder for transferring stock slice by slice from said holder into operative relation with said cutter, and a plurality of discharge elements for receiving segments of stock after each operation of said cutter.

24. In a filling machine, a series of receptacles for receiving charges of stock; a stock feeder for supplying stock to said receptacles including a stock holder, a stock cutter, and means for feeding stock from said holder to said cutter; means for discharging cut stock from said stock feeder into said receptacles; means for driving said receptacles and said stock feeder in a timed relation; and means for adapting said discharging and driving means to effect simultaneous discharge of stock into a plurality of said receptacles.

25. In a filling machine, a series of receptacles for receiving charges of stock and having a path of movement; a stock feeder for supplying stock to said receptacles including a stock holder, a stock cutter, and means for feeding stock from said holder to said cutter; means for discharging cut stock from said stock feeder into said receptacles; and means for adapting said discharging means to effect simultaneous discharge of stock into a plurality of said receptacles, including a plurality of discharge spouts having their intake ends positioned to receive equal amounts of cut stock from said cutter and having their discharge ends disposed along said path of movement to place said equal amounts in a plurality of said receptacles.

26. In a filling machine, a series of receptacles for receiving charges of stock and having a path of movement; a stock feeder for supplying stock to said receptacles including a stock holder, a stock cutter, and means for feeding stock from said holder to said cutter; means for discharging cut stock from said stock feeder into said receptacles; means for adapting said discharging means to effect simultaneous discharge of stock into a plurality of said receptacles, including a plurality of discharge spouts having their intake ends positioned to receive equal amounts of cut stock from said cutter and having their discharge ends along said path of movement to place said equal amounts in a plurality of said receptacles; and means for driving said stock feeder and said receptacles including means for adapting said driving means to change the speed relation between said stock feeder and said receptacles in accordance with the number of discharge spouts.

27. In a machine for preparing sliced stock such as sliced pineapple, a stock cutter, means for holding a stack of stock units, a feed table having a perforated stock unit receiving seat for alignment with said holding means to receive a stock unit and for subsequent alignment with said cutter to present said unit thereto, said perforations matching said cutter to permit penetration of said cutter through said seat, and means for reciprocating said feed table between said cutter and said holding means including means for effecting a back and forth movement of said feed table during transfer of stock thereto from said holding means.

28. In a machine for preparing sliced stock such as sliced pineapple, a stock cutter, means for holding a stack of stock units, a feed table having a stock unit receiving seat for alignment with said holding means to receive a stock unit and for subsequent alignment with said cutter to present said unit thereto, means for adapting said seat to receive units of various sizes, and means for reciprocating said feed table between said cutter and said holding means including means for effecting a back and forth movement of said feed table during transfer of stock thereto from said holding means.

29. In a stock preparation machine for cutting sliced stock into segments, a cutter comprising a plurality of knives, discharge means positioned below and in vertical alignment with said cutter, and a feeder for positioning and supporting slices of stock in operative relation to said cutter above and in vertical alignment with said discharge means, said feeder having slots for alignment with said knives during the cutting operation.

ALBERT R. THOMPSON.